United States Patent [19]

Bionaz

[11] 4,406,355
[45] Sep. 27, 1983

[54] TRANSMISSION WITH HYDRAULIC COUPLING MEMBER AND LOCKING CLUTCH

[75] Inventor: Jean Bionaz, Fontenay-sous-Bois, France

[73] Assignee: Valeo, Paris, France

[21] Appl. No.: 224,840

[22] Filed: Jan. 13, 1981

[30] Foreign Application Priority Data

Jan. 25, 1980 [FR] France .............................. 80 01598

[51] Int. Cl.³ ............................................ F16D 47/06
[52] U.S. Cl. ..................................... 192/3.3; 192/3.58
[58] Field of Search ................... 192/3.28, 3.29, 3.3, 192/3.31, 3.33, 3.58; 74/732, 733; 137/102, 118

[56] References Cited

U.S. PATENT DOCUMENTS

| | | | |
|---|---|---|---|
| 3,059,740 | 10/1962 | Roche | 192/3.28 |
| 3,977,502 | 8/1976 | Chana | 192/3.31 |

FOREIGN PATENT DOCUMENTS

| | | |
|---|---|---|
| 1258842 | 3/1961 | France . |
| 2102439 | 4/1972 | France . |
| 2102502 | 4/1972 | France . |
| 2311962 | 12/1976 | France . |

*Primary Examiner*—George H. Krizmanich
*Attorney, Agent, or Firm*—Charles E. Brown

[57] ABSTRACT

A transmission is disclosed comprising a hydraulic coupling and a lock-up clutch, a tubular distributor slide valve element provides permanent communication between the hydraulic coupling member and an inlet conduit and controls fluid flow between the inlet conduit and a clutch control chamber for operating the lock-up clutch. The distributor valve member comprises two relative large diameter portion therebetween. In the closed position of the distributor valve member the control chamber is brought into communication with an outlet conduit for returning the fluid from the control chamber to a storage tank.

3 Claims, 3 Drawing Figures

TRANSMISSION WITH HYDRAULIC COUPLING MEMBER AND LOCKING CLUTCH

BACKGROUND OF THE INVENTION

The present invention relates to a transmission comprising a hydraulic coupling member and a locking or blocking clutch, and more particularly to a motor vehicle transmission of the kind comprising, between an input element which is intended to rotate integrally with a first shaft (generally a drive shaft), and an output element which is intended to rotate integrally with a second shaft (generally a driven shaft), firstly a hydraulic coupling member such as a torque converter, which comprises an impeller wheel rotating integrally with the input element, and a turbine wheel rotating integrally with the output element, and secondly, a locking or blocking clutch, commonly called a "LOCK UP," which, upon starting and generally upon each change of gear ratio is in a first, disengaged, condition in which the hydraulic coupling member alone operatively interconnects the input element and the output element, and which, in a second engaged condition, once the initial starting phase has been completed, renders this hydraulic coupling member inoperative and locks up the transmission so as to eliminate any residual slipping due to said member and so as to improve thereby the efficiency of the whole assembly, by ensuring a direct mechanical coupling between the input element and the output element.

The invention is aimed, more precisely at transmissions of this kind which are intended to be incorporated in motor vehicles.

These can be either transmissions with semi-automatic control or transmissions with fully automatic control.

In practice, in transmissions of this kind, the locking clutch possesses a coupling element which is mounted to be movable axially and which, rotating integrally with the output element, is capable of being made to rotate integrally with the input element by means of friction.

Likewise in practice, for transmissions of this kind, fluid-circulation means are provided which comprise an inlet pipe for supplying fluid under pressure and an outlet pipe for returning said fluid to a collecting tank.

In the prior art, the locking or blocking clutch usually is controlled by adjusting the direction of circulation of this fluid under pressure: in one direction of circulation, the fluid under pressure penetrates into the transmission via a control chamber engaged with or disengaged from the clutch, which is referred to below as the control chamber and which is formed between the coupling element of said clutch and a wall integral with the input element, so that this clutch is then maintained in a disengaged position; for the opposite direction of circulation, the fluid under pressure penetrates into the transmission via the hydraulic coupling member so that it presses the coupling element of the clutch against the said wall of the input element and so that the clutch is, in this way, adjusted to the engaged position.

In practice, the corresponding controls have always been arranged on the exterior of the transmission, on the fluid-circulation means which serve said transmission, and the result is that, to change from a transmission having no locking or blocking clutch to a transmission having such a clutch, it is necessary to substantially modify these fluid-circulation means. This can be difficult and troublesome to carry out, at least for certain applications.

Consequently, provision has been made in the present invention to integrate with the transmission itself, when it has a locking or blocking clutch, the means designed to bring this clutch into, or out of, operation.

In the known arrangement proposed for this purpose, there is provided on the transmission inlet pipe, within the transmission itself, a tubular distributor slide-valve, which, via its central bore, is suitable for permanently serving the hydraulic coupling member, and which, acted upon by elastic means restoring it in the direction of a position of rest, is movable between such a position of rest, in which it blocks a passage, referred to below as the control passage, which causes said inlet pipe to communicate with the control chamber of the clutch, and a working position, in which, by opening said control passage, it permits free communication between the inlet pipe and the control chamber of the clutch, to effect disengagement of said clutch. There are also provided on the outlet pipe of the transmission, on the exterior of this transmission, two passages which are arranged in parallel, each of which is regulated by a controlled clack-valve, said passages thus constituting together means of passage with a variable cross-section which is regulated by said controlled clack-valve.

When these two clack-valves are open the pressure at the outlet of the transmission is relatively low, so that, by means of the pressure at the inlet or the supply pressure, the distributor slide-valve is forced into the working position. This opens the control passage of the clutch and consequently, said clutch is adjusted into the disengaged position.

When the clack-valve which is controlled is closed the pressure at the outlet of the transmission is sufficient to ensure that, as the pressure difference at the inlet and at the outlet becomes less than the load of its elastic restoring means, the distributor slide-valve blocks the control passage of the clutch. The said clutch is then no longer set in the disengaged position and can normally, subject to the then relatively elevated pressure which prevails in the transmission, pass into the engaged position.

Nevertheless, in practice, when the valve is in the position of rest, such an arrangement can fail due to the fact that, since one and the same pressure then prevails on both faces of the coupling element of the clutch, this coupling element is not applied sufficiently energetically to the corresponding wall of the input element.

An object of the present invention is to provide an arrangement which enables this disadvantage to be minimised or avoided.

SUMMARY

The invention provides a transmission comprising a hydraulic coupling member and a locking or blocking clutch, particularly for a motor vehicle, wherein in parallel between an input element which is intended to rotate integrally with a first shaft, generally a drive shaft, and an output element which is intended to rotate integrally with a second shaft, generally a driven shaft, firstly, a hydraulic coupling member such as a torque converter or coupler which comprises, an impeller wheel rotating integrally with the input element and a turbine wheel rotating integrally with the output element, and secondly a locking or blocking clutch, commonly called a "LOCK UP," said locking or blocking clutch comprising a coupling element which is mounted to be movable axially and which, rotating integrally with the output or input element, is capable of being made to rotate, particularly by means of friction, integrally with the input or output element, in combination with fluid-circulation means which comprise an inlet pipe for supplying fluid under pressure and an outlet pipe for returning said fluid to a collecting tank, with on the inlet pipe, within the transmission itself, a distributor element, which, via a bore, is suitable for permanently serving the hydraulic coupling member and which, acted upon by means restoring it in the direction of a position of rest, is movable between such a position of rest, in which it blocks a passage, referred to below as the control passage, which causes said inlet pipe to communicate with a control chamber engaged with or disengaged from the clutch, and a working position, in which, by opening said control passage, it permits free communication between the inlet pipe and the control chamber of the clutch, to effect disengagement of said clutch, and, on the outlet pipe, on the exterior of the transmission, means of passage with variable cross-section which are adjusted by a controlled clack-valve, this transmission being characterised in that said distributor element is adapted to put the control passage of the clutch in communication with the collecting tank.

In this way, when the controlled clack-valve is closed, the coupling element of the clutch can be applied energertically against the corresponding wall of the input element, the control chamber of the clutch being directly linked to the collecting tank, thus permitting the delivery of fluid necessary for this application.

DETAILED DESCRIPTION OF THE PREFERRED EMBODIMENTS

Figure 1:
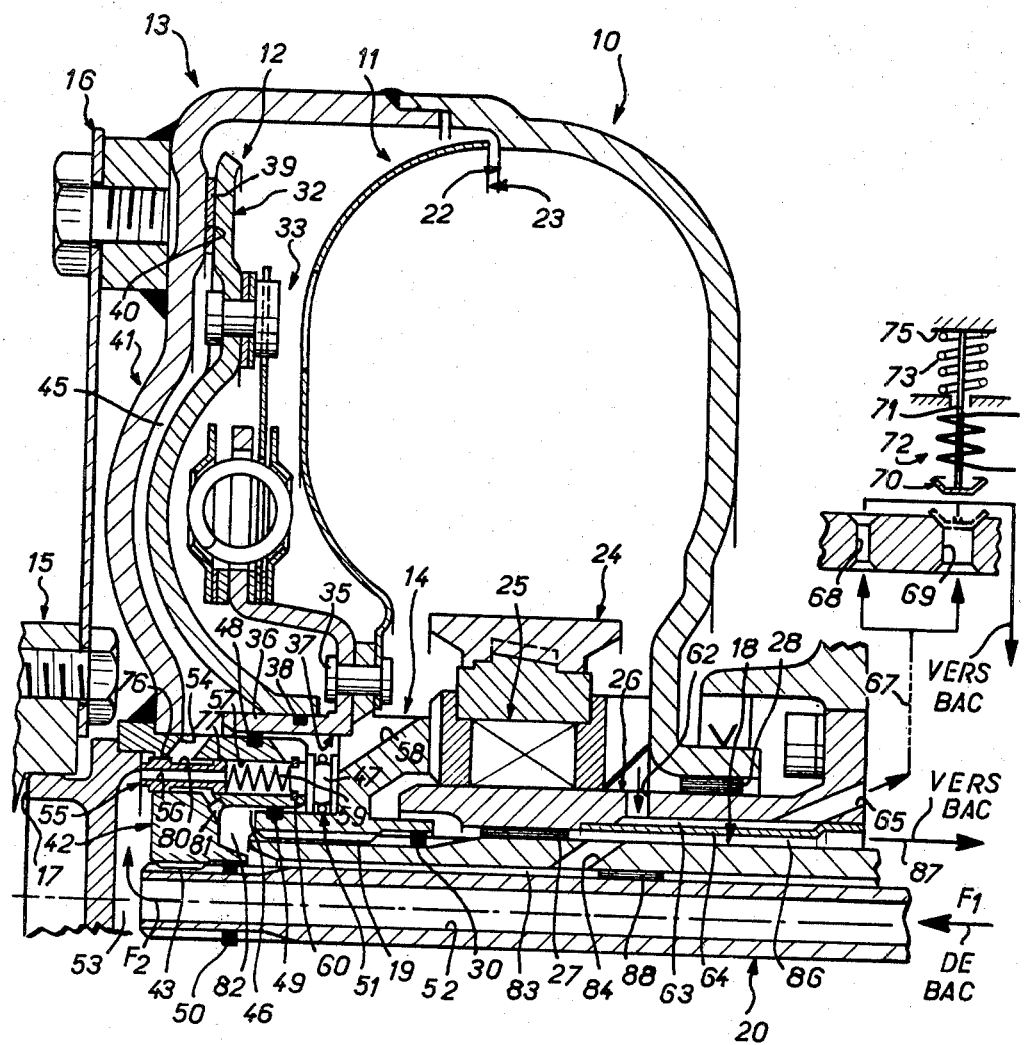
FIG. 1 is a half-view in axial section of a transmission according to the invention, this transmission being in the rest position corresponding, also, to its "LOCK UP" condition.

FIG. 1 shows a transmission 10 with a hydraulic coupling member 11 and a locking or blocking clutch 12, called a "LOCK UP," of the kind which equips certain motor vehicles.

The transmission can be a transmission with an automatic control system or a transmission with a semi-automatic control system.

Since a transmission 10 of this kind is not in itself the subject of the present invention, it has not been represented in full detail in FIG. 1, particularly as regards its control. In FIG. 1, only the components of the transmission and control system which are affected by the present invention have been more particularly represented.

The hydraulic coupling member 11 and the clutch 12 which comprise the transmission 10, are installed in parallel between an input element consisting of the rotating case 13 of the assembly, and an output element, consisting in the embodiment illustrated, of a tubular hub 14.

The case 13 is intended to rotate integrally with a first shaft 15, generally a drive shaft. A driving diaphragm 16 connects the shaft 15 to the case 13 for this purpose.

The case is also fixed on the shaft 15, for the purpose of centering, by means of a stud 17 which projects axially from said case.

The tubular hub 14 is intended to rotate integrally with a second shaft 18, generally a driven shaft, and a grooved fitting 19 is provided for this purpose between the tubular hub 14 and the shaft 18.

In practice, the drive shaft 15 is itself intended to rotate integrally with the output shaft of the engine of a vehicle and in one embodiment may be constituted directly by this output shaft, whilst the driven shaft 18 is intended to rotate integrally with the input shaft of a gearbox, which in one embodiment may be constituted directly by this input shaft.

In the embodiment illustrated, the output shaft 18 is tubular and it surrounds coaxially a central shaft 20, itself tubular, which is intended to drive an accessory, for example an oil pump.

In the embodiment illustrated, the hydraulic coupling member 11 is, moreover, a torque converter: besides an impeller wheel 22 and a turbine wheel 23, it also has a reactor wheel 24; however, it could just as well be a simple coupler, in which case no reactor wheel is provided.

The impeller wheel 22 is fixed directly to the internal wall of the rotating case 13; it therefore rotates integrally with said case which constitutes the input element of the transmission 10.

The turbine wheel 23 is carried by the tubular hub 14 constituting the output element of the transmission 10 and therefore rotates integrally with said hub.

Finally, the reactor wheel 24 is, in turn, carried, via a free wheel 25, by a tubular hub 26, which extends coaxially around the driven shaft 18, a bearing 27 being interposed.

Likewise, a bearing 28 is provided between this tubular hub 26 and the rotating case 13.

Furthermore, a gasket 30 is provided between the tubular hub 14 and the driven shaft 18.

Taken as a whole, the clutch 12 comprises, in the embodiment illustrated, a coupling element 32 and a torsion-damping hub 33.

In the embodiment illustrated, the damping hub 33 is, on its outer periphery, linked to the coupling element 32 by a splined connecting piece, which is the subject of the French patent filed on Apr. 2, 1979 under No. 79/08192. Such a splined connecting piece is not indispensible; on the contrary, other forms of connection can be provided.

On its inner periphery, the torsion-damping hub 33, which is designed in a way known per se and, as it is not part of the present invention, will not be described in detail here, is connected to the tubular hub 14 by the same rivets 35 as those which cause said tubular hub to govern the turbine wheel 23 of the hydraulic coupling member 11.

Furthermore, on its inner periphery, the torsion-damping hub 33 constitutes axially a bush 36 which goes to make up an annular cavity 37 for the tubular hub 14 with which it is integral.

The coupling element 32 of the clutch 12 comprises an annular flange, which, on its inner periphery, is mounted to be movable axially on the bush 36 of the torsion-damping hub 33 by means of a piston cylinder arrangement which is sealed by a gasket 38. In the embodiment illustrated, the said annular flange carries on its outer periphery, an annular friction lining 39, located opposite an annular area 40 of the corresponding transverse wall 41 of the rotating case 13. In an alternative embodiment the friction lining 39 can be carried by the wall 41 of the case.

By means of the friction lining 39, the coupling element 32, which, via the torsion-damping hub 33, rotates integrally with the tubular hub 14 constituting the output element of the transmission 10, is capable of being made to rotate, by means of friction, integrally with the rotating case 13 which constitutes the input element of this transmission 10.

Internally, there projects axially from this rotating case 13 a tubular hub 42, with which the central shaft 20 rotates integrally by means of a grooved arrangement 43, and which, together with the transverse wall 41 of the case 13 and the coupling element 32 of the clutch 12, defines, for this clutch 12, in the embodiment illustrated, an engaged or disengaged control chamber 45, referred to below as the control chamber.

Moreover, this tubular hub 42 possesses axially an annular extension 46, by means of which it engages axially in the annular cavity 37 of the tubular hub 14, an axial bearing 47 being interposed.

Thus, the tubular hubs 14 and 42 penetrate one into the other.

A rotary gasket is provided between these tubular hubs, both on the radially outermost face of the annular extension 46 of the tubular hub 42, namely the gasket 48, and on the radially innermost face of this annular extension 46, namely the gasket 49.

Likewise, a gasket 50 is provided between the tubular hub 42 and the central shaft 20.

Furthermore, a ball bearing 51 is provided between the tubular hubs 42 and 14.

Means of circulating fluid under pressure are provided for the transmission 10. These fluid-circulation means possess an inlet pipe, which, starting from a collecting tank (not shown), is constituted successively by the axial bore 52 of the central shaft 20, a chamber 53 into which this bore 52 emerges at right angles of the transverse wall 41 of the rotating case 13, and a passage 54, which, formed in the tubular hub 42, is capable of enabling the preceding chamber 53 to communicate with the control chamber 45 of the clutch 12 and which constitutes the control passage of said clutch.

Figure 2:
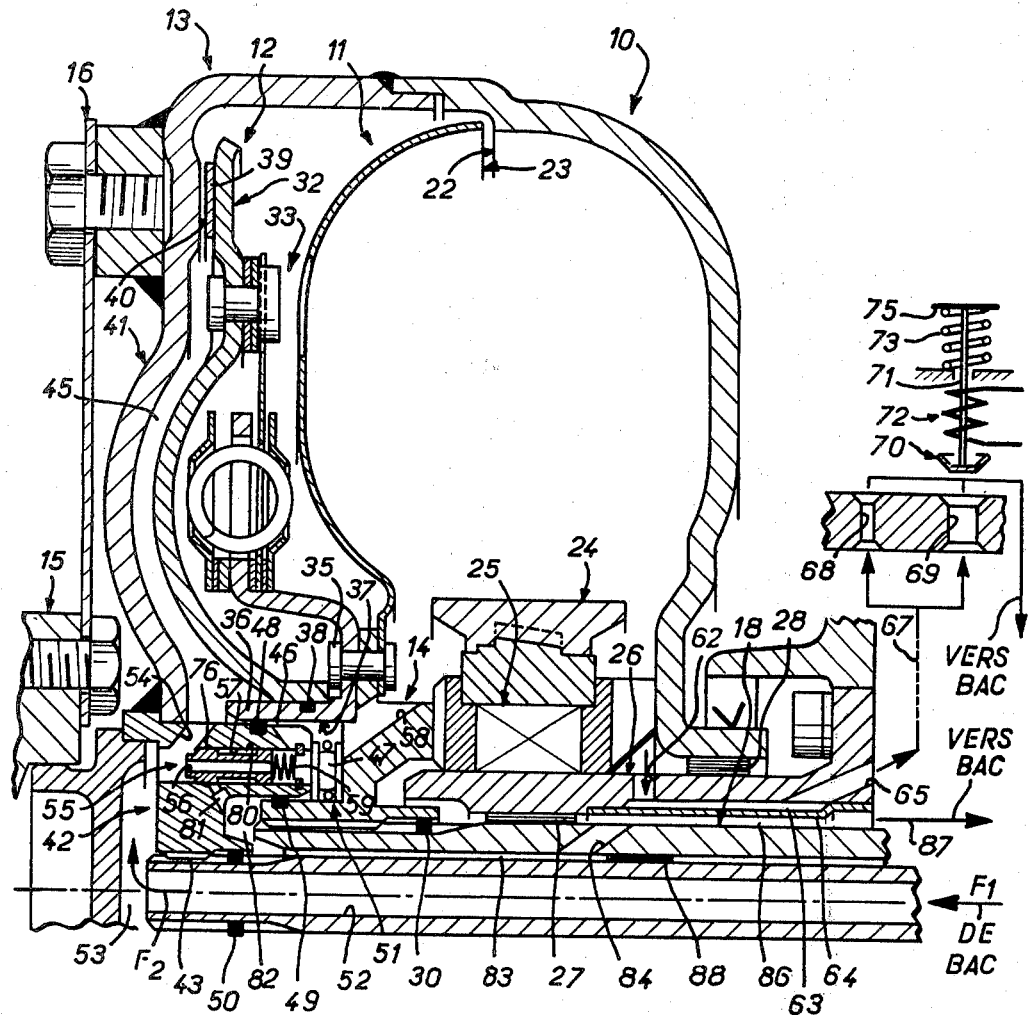
FIG. 2 is a view equivalent to that of FIG. 1, with the transmission in the position in which only its hydraulic coupling member is in operation.

Provided on this inlet pipe, within the transmission 10 itself, is a distributor element 55, which, by means of a bore 56, is suitable for permanently serving the hydraulic coupling member. The said element 55, being acted upon by elastic means restoring it in the direction of a position of rest, is movable between such a position of rest, in which, as illustrated in FIG. 1, it blocks the passage 54, and a working position, in which as illustrated in FIG. 2, it opens this passage 54 and thus permits free communication between the inlet pipe, and, more precisely, both the chamber 53 of the inlet pipe, and the control chamber 45 of the clutch 12.

In practice, in the embodiment illustrated, this distributor element constitutes a tubular slide 55, whose bore 56 is the central bore. The said distributor element is mounted movably in a bore 57 of the tubular hub 42, which emerges at right angles to a passage 58 formed obliquely in the tubular hub 14, starting from the bottom of the tubular cavity 37 of the tubular hub 14 at the base of the turbine wheel 23, so as to serve the volume encompassed between this turbine wheel 23 and the impeller wheel 22, said volume being the internal volume of the hydraulic coupling member 11.

Preferably, and as illustrated, the bore 57, in which the distributor element 55 is accommodated, extends, according to the invention, parallel to the axis of the whole assembly, so that this distributor element is movable parallel to this axis, without a component of movement which is due to centrifugal force; however, without departing from the scope of the invention, it can be inclined slightly to the axis of the whole assembly or, in other words, be only substantially parallel to this axis, such that the component of movement, which is due to centrifugal force, is sufficiently small to be acceptable.

In practice, the restoring means associated with the distributor element 55 are, in the embodiment illustrated, constituted by a spring 59. In the embodiment illustrated, the said spring 59 bears on an elastic split ring 60, which is arranged in a groove of the tubular hub 42, at the end of the bore 57 of the tubular hub 42 which is opposite the transverse wall 41 of the rotating case 13. In an alternative embodiment, this spring can bear on the bottom of the bore 57, if this has such a bottom, or on the piece located at the end of this bore.

To return the fluid under pressure to the collecting tank, the fluid-circulation means associated with the transmission 10 possess an outlet pipe, which possesses, in particular, starting from the internal volume of the hydraulic coupling member 11, a passage 62, formed transversely in the tubular hub 26, and an annular passage 63, formed between this tubular hub 26 and a bush 64 fitted to the inner periphery thereof, around the driven shaft 18.

This annular passage 63, communicates, via a passage 65 in the tubular hub 26, with an exterior pipe 67, which is indicated by a partly broken line in FIG. 1.

Arranged in this pipe 67, which is connected to the collecting tank, are means of passage of variable cross-section, which are adjusted by means of a controlled clack-valve 70. In the embodiment illustrated, these consist of two parallel passages 68, 69.

The passage 68, has a smaller cross-section than the passage 69 and is free.

The passage 69, which is of larger cross-section, is adjusted by the controlled clack-valve 70.

For example, and as illustrated, such a clack-valve 70 can be driven by the plunger 71 of an electromagnetic relay 72. The said clack-valve is permanently acted upon in a direction in which it leaves the passage 69 open, by means of a spring 73 which bears on the frame 75 of the whole assembly and which acts on the plunger 71.

According to the invention, the tubular slide constituting the distributor element 55 is adapted to put the control passage 54 of the clutch 12 in communication with the collecting tank. Preferably, and as illustrated, this slide has two bearing surfaces 76, 77 and, between these, it has a portion of reduced outer cross-section 80, which is suitable for enabling the control passage 54 of the clutch 12 to communicate with an outlet port 81 connected to the collecting tank.

In practice, this outlet port 81 causes the bore 57 of the tubular hub 42 to communicate with the chamber 82, which is formed jointly by the tubular hub 42, the tubular hub 14, the driven shaft 18 and the central shaft 20.

This chamber 82 is connected to the collecting tank by, successively, an annular passage 83 between the driven shaft 18 and the central shaft 20, a passage 84 provided transversely in the driven shaft 18, an annular passage 86 between the driven shaft 18 and the bush 64 surrounding same, this bush thus isolating this passage 84 from the above-described outlet pipe, and a pipe 87, which, as indicated by an arrow in FIG. 1, rejoins the collecting tank.

A bearing 88, constituting a sealing gasket, is provided between the driven shaft 18 and the central shaft 20, beyond the passage 84 of the driven shaft 18 relative to the outlet port 81, in order to prevent any detrimental leakage between the driven shaft 18 and the central shaft 20.

At rest, with the drive stationary, as in FIG. 1, the clack-valve 70 leaves the passage 69 open, the tubular distributor slide-valve 55 blocks the passage 54 and the coupling element 32 of the clutch 12 occupies an intermediate fixed position, the friction lining 39, being possibly, but not necessarily, in contact with the area 40 of the transverse wall 41 of the rotating case 13.

Upon starting a motor vehicle equipped with the transmission or upon a change of gear ratio, the clack-valve 70 is immediately closed against the action of the spring 73.

As a result, the two passages 68, 69 of the outlet pipe are initially operative and they jointly ensure a considerable flow of fluid.

The incoming fluid, which penetrates via the bore 52 of the central shaft 20, as indicated by the arrow $F_1$ of FIG. 1, reaches the chamber 53, as indicated by the arrow $F_2$. Then, via the bore 56 of the slide constituting the distributor element 55 and via the passage 58 of the tubular hub 14, the said fluid reaches the internal volume of the hydraulic coupling member 11, before arriving at the outlet pipe.

Figure 3:
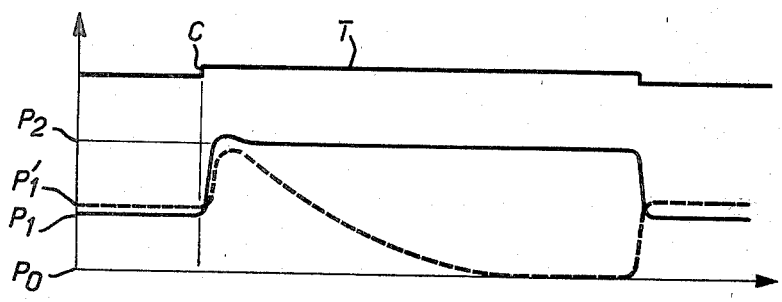
FIG. 3 is a diagram illustrating the operation of this transmission.

Since the cross-section of passage of said outlet pipe, which is due to the passages 68, 69, is then relatively large, the pressure at the outlet 11A of the hydraulic coupling member 11 is at a relatively low level $P_1$, as indicated by a continuous line in the diagram of FIG. 3, in the left part of this diagram.

Under the effects of the pressure $P'_1$ of the fluid entering the chamber 53, which pressure, as indicated by broken lines in the diagram of FIG. 3, is deliberately larger than the pressure $P_1$ because of the exact calibration of the bore 56, the passages 68, 69 and of the spring 59, the slide constituting the distributor element 55 is forced from left to right against this spring 59. The passage 54 of the tubular hub 42, which constitutes the control passage of the clutch 12, is therefore uncovered and the control chamber 45 of the clutch is supplied with fluid under pressure. The said clutch is therefore adjusted to the disengaged position, its coupling element 32 moving away from the transverse wall 41 of the rotating case 13, according to FIG. 2.

Consequently, the hydraulic coupling member 11 is operative between the input element and the output element of the transmission 10 only at starting and at each change of gear ratio.

This situation continues until a square-wave voltage pulse is sent to the relay 72 controlling the clack-valve 70, as indicated at C on the line T of the diagram in FIG. 3.

The clack-valve 70 then blocks the passage 69, as indicated by broken lines in FIG. 1, so that the flow rate of the outlet pipe is, from that moment, limited to that allowed by the passage 68.

Consequently, the pressure at the outlet of the hydraulic coupling member 11 rises to the vicinity of a level $P_2$, higher than the preceding level $P_1$, and is held there, as indicated by a continuous line in the diagram of FIG. 3, in the middle part of this diagram.

Under the effects of its restoring spring 59, the distributor slide-valve 55 returns to its position of rest, according to FIG. 1, in which it blocks the control passage 54 of the clutch 12. The inner chamber 45 of said clutch is then no longer supplied with incoming fluid under pressure. On the contrary, via the outlet port 81 it is connected to the collecting tank, which acts as a discharge reservoir.

As a result, the pressure in this inner chamber 45 of the clutch 12 falls progressively, the outlet port 81 being calibrated for this purpose, to a pressure level $P_0$ which is that of the collecting tank.

The coupling element 12 is therefore subjected, in this case, to a differential pressure, which increases and which acts upon it in the direction of the transverse wall 41 of the rotating case 13.

Consequently, this coupling element 12 progressively applies its friction lining 39 against the area 40 of this transverse wall 41, thus ensuring that the clutch 12, of which it forms part, is progressively brought into the engaged position.

When this engagement is completed, a direct mechanical connection is established, by means of the clutch 12, between the input element and the output element of the transmission 10, the hydraulic coupling member 11 of the latter thus being rendered inoperative; nevertheless, it continues to be supplied with fluid via the bore 56 of the distributor element 55, the pressure necessary to apply the coupling element 12 against the transverse wall 41 of the rotating case 13 being obtained by means of an exact calibration of the bore 56, of the passage 68 and of the spring 59.

No residual slipping therefore exists any longer in the transmission 10, once the starting phase, or the initial phase of a change of gear ratio, has been completed.

This situation continues as long as the square-wave voltage pulse C is applied to the relay 72.

When this voltage is stopped, for example upon a new change of gear ratio, the clack-valve 70 is, again, controlled to opening, which brings the pressure at the outlet of the hydraulic coupling member 11 down to the level $P_1$ and the pressure in the inner chamber 45 of the clutch 12 to the level $P'_1$, as before, as indicated in the right-hand part of the diagram of FIG. 3.

In an alternative embodiment, the clack-valve 70 can be closed in a position of rest; however, it is advantageous if it is open for such a position of rest, since, in the case of failure of the electrical circuit, only the hydraulic coupling 11 will remain operative.

The shaft 20 provided for driving, for example, an oil pump can be eliminated, and this oil pump can, for example, be driven directly by the rotating case 12; the distributor element 55 is, in this case, accommodated in a bore by means of a turbine and the whole assembly is supplied with fluid via the shaft 18.

I claim:

1. A fluid transmission comprising an input element adapted to be fixed for rotation with a first shaft and an output element adapted to be fixed for rotation with a second shaft, a hydraulic coupling including an impeller member fixed for rotation with said input element and a turbine member fixed for rotation with said output element; a lock-up clutch comprising an axially movable coupling element fixed for rotation with a selected one of said input element and said output element and adapted to be coupled for rotation with the nonselected element by frictional engagement means, fluid circuit means comprising an inlet conduit for supplying fluid under pressure and an outlet conduit for returning fluid to a collecting tank, a distributor valve element disposed in said transmission and having a bore permanently communicating with said hydraulic coupling, said distributor valve element controlling fluid flow through a fluid control passage communicating with a clutch control chamber operable to control the engagement and disengagement of said lock-up clutch, means biasing said distributor valve element to a rest position in which said distributor valve element closes off said fluid control passage and prevents clutch disengagement, said distributor valve element having an operative position for opening said control passage and bringing said input conduit into communication with said control chamber and thereby disengaging said clutch; passage means connected to said outlet conduit, externally controlled valve means in said passage means for varying the effective cross section thereof, said distributor valve element bringing said control passage into communication with said outlet conduit when said distributor valve element is in its rest position for returning fluid from said control chamber to said storage chamber.

2. The transmission of claim 1, wherein said distributor valve element is mounted for movement substantially parallel to the axis of the entire transmission.

3. The transmission of claim 1, wherein said distributor valve element is a spool valve having two relatively large diameter bearing zones and a relatively small diameter portion therebetween, said relatively small diameter portion lying in the path between the control passage and the outlet conduit in the rest position of said distributor valve element to permit the flow of fluid from the control chamber around the small diameter portion.

* * * * *